UNITED STATES PATENT OFFICE.

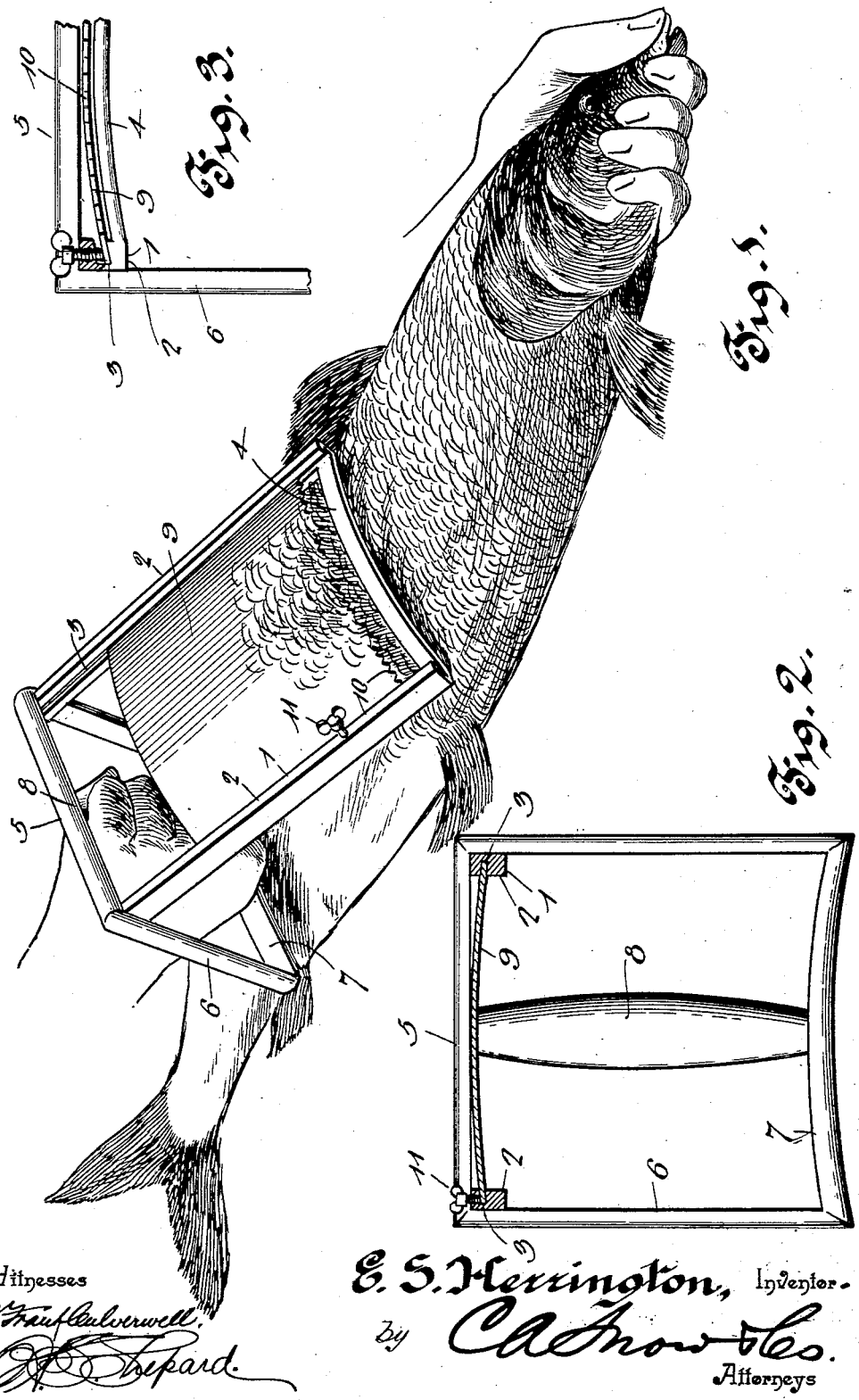

ELIAS S. HERRINGTON, OF PAYETTE, IDAHO.

FISH-SCALING IMPLEMENT.

SPECIFICATION forming part of Letters Patent No. 677,543, dated July 2, 1901.

Application filed June 12, 1900. Serial No. 20,054. (No model.)

*To all whom it may concern:*

Be it known that I, ELIAS S. HERRINGTON, a citizen of the United States, residing at Payette, in the county of Canyon and State of Idaho, have invented a new and useful Fish-Scaling Implement, of which the following is a specification.

This invention relates to means for scaling fish, and has for its object to provide an improved hand-operated implement which is arranged for conveniently and effectively removing the scales without tearing or otherwise damaging the flesh of the fish. It is furthermore designed to provide a frame for adjustably and removably supporting an improved form of scaling-blade and to arrange the frame to rest upon the fish in the operation of the device, so as to insure the proper action of the blade and to facilitate the manipulation of the device.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view illustrating the application and operation of the present implement. Fig. 2 is a transverse sectional view of the device. Fig. 3 is a detail sectional end elevation of one corner of the forward end of the frame.

Corresponding parts are designated by like characters of reference in all of the figures of the drawings.

Referring to the drawings, 1 designates the main frame of the device, which is substantially rectangular in shape and formed of wood or metal, as may be desired. The inner face of each longitudinal side bar 2 is provided with a longitudinal groove 3, which opens outwardly through the forward end of the bar and above the front end bar 4, which latter is bowed upwardly. Thus the forward ends of the grooves are unobstructed, while the rear ends thereof are closed by means of the rear end bar 5.

Pendent from the rear end of the main frame is a substantially rectangular handle-frame 6, the lower end bar 7 of which is bowed upwardly, and an intermediate vertical handle or hand-grasp 8 has its opposite ends connected to the opposite end bars of the handle-frame. It will be noted that the end bar 5 is common to both frames.

The scaling-blade 9 is formed of a metal plate, which has its opposite edges slidably fitted in the grooves of the respective sides of the main frame and is bowed laterally and upwardly. The forward transverse edge of the plate or blade is provided with teeth, as indicated at 10 in Fig. 1 of the drawings, and this active edge is disposed slightly in rear of the forward end bar 4. It will now be understood that the forward ends of the grooves are open, so as to permit of the insertion and removal of the blade. A suitable set-screw 11 is carried by the upper face of one of the sides of the frame and enters the adjacent groove, so as to bind upon the blade and hold the latter against accidental movement. By this means the blade may be adjusted to vary the distance between the active edge thereof and the front end bar of the frame.

In the operation of the device the front end bar 4 and the lower end bar 7 of the handle-frame are placed upon the body of the fish, as clearly illustrated in Fig. 1 of the drawings, the head of the fish being held in one hand and the other hand grasping the handle-bar 8, the implement being pushed forward from the tail of the fish in the manner of a plane. It will now be seen that the end bars 4 and 7 are bowed upwardly, so as to fit transversely the rounded portion of the body of a fish, and the scaling plate or blade is likewise bowed for the same purpose.

By having the active edge of the blade slightly in rear of the front end bar 4 the latter presses upon the body of the fish and forms a scale-rucking device, which rucks up or raises a transverse row of scales immediately in rear of the bar, so that the scaling-blade may engage beneath the elevated free edges of the scales, and thereby remove the same without tearing or otherwise damaging the flesh of the fish. It will also be observed that the scales are conveniently deposited upon the blade, which forms a receptacle for receiving the scales as they are scraped from the fish.

What is claimed is—

1. A fish-scaling implement, comprising a body, having a combined fish-engaging rest and scale-rucking member for raising the free edges of fish-scales, and a scaling-blade carried by the body and located in rear of and above the rest, for taking under the elevated scales without damaging the flesh of the fish, the interval between the blade and the rest forming a space for receiving the rucked-up edges of the fish-scales.

2. A fish-scaling implement, comprising a substantially rectangular skeleton frame, the opposite longitudinal side bars of which have longitudinal grooves in their inner faces and opening outwardly at the front end of the frame, the front cross-bar being located below the open ends of the grooves, a pendent handle-frame at the rear end of the body-frame, and having a lower transverse end bar, an intermediate upright handle-bar within the handle-frame, a laterally and upwardly bowed scaling-blade fitted in the opposite grooves of the side bars, and having a front toothed scaling edge located in rear of the front end bar, and a set-screw to detachably hold the blade to the frame.

3. A fish-scaling implement, having an upwardly and rearwardly inclined body-frame, a pendent handle-frame at the rear end thereof, and a scaling-blade carried by the body-frame, the forward and lower end bars of the respective frames forming rests for engagement with a fish.

4. A fish-scaling implement, comprising a pair of angularly-related frames, the outer end bars of which form rests for engagement with a fish, and a scraping-blade carried by one of the frames, and having its active edge located adjacent to the outer end bar and in rear thereof.

5. A fish-scaling implement, comprising a skeleton upwardly and rearwardly inclined frame, having a front and bottom end bar forming a fish-engaging and scale-rucking member, a rear fish-engaging rest pendent from the frame, and a transverse scaling-blade carried by the frame and located in rear of and above the rucking-bar, the interval between the said rucking-bar and the scaling-blade forming a space for the reception of the rucked-up edges of the scales.

In testimony that I claim the foregoing as my own I have hereto affixed my signature in the presence of two witnesses.

ELIAS S. HERRINGTON.

Witnesses:
PETER PENCE,
BENJ. MITCHEL.